(12) United States Patent
Huang et al.

(10) Patent No.: US 9,953,461 B2
(45) Date of Patent: Apr. 24, 2018

(54) NAVIGATION SYSTEM APPLYING AUGMENTED REALITY

(71) Applicants: Institute of Nuclear Energy Research Atomic Energy Council, Executive Yuan, Taoyuan (TW); National Yunlin University of Science & Technology, Yunlin (TW)

(72) Inventors: Chung-Hao Huang, Taoyuan (TW); Lun-Hui Lee, Taoyuan (TW); Chian-Cheng Ho, Taipei (TW); Bo-Kai Wang, Tainan (TW)

(73) Assignees: Institute of Nuclear Energy Research Atomic Energy Council, Executive Yuan, Taoyuan (TW); National Yunlin University of Science & Technology, Yunlin (TW)

( * ) Notice: Subject to any disclaimer, the term of this patent is extended or adjusted under 35 U.S.C. 154(b) by 0 days.

(21) Appl. No.: 15/256,791

(22) Filed: Sep. 6, 2016

(65) Prior Publication Data
US 2017/0116783 A1    Apr. 27, 2017

(30) Foreign Application Priority Data

Oct. 26, 2015    (TW) .............................. 104135036 A

(51) Int. Cl.
*G01C 21/20* (2006.01)
*G06T 19/00* (2011.01)
(Continued)

(52) U.S. Cl.
CPC ............ *G06T 19/003* (2013.01); *G01C 21/18* (2013.01); *G01C 21/206* (2013.01);
(Continued)

(58) Field of Classification Search
None
See application file for complete search history.

(56) References Cited

U.S. PATENT DOCUMENTS 9,626,800 B2 *   4/2017   Hall .................... G06T 19/006
9,767,616 B2 *   9/2017   Miller ................. G06T 19/006
(Continued)

FOREIGN PATENT DOCUMENTS

TW          201434311 A       9/2014

OTHER PUBLICATIONS

Chian-Cheng Ho, "Study on Augmented Reality Application for SLAM-Based Nuclear Facility Decommissioning Task", Nov. 28, 2014, full text.

*Primary Examiner* — Rami Khatib
(74) *Attorney, Agent, or Firm* — Trop Pruner & Hu, P.C.

(57) ABSTRACT

A navigation system includes a measurement unit that outputs a positioning signal associated with positioning coordinates, a navigation unit that obtains guidance indication and that outputs a navigation signal, and an image unit that includes a capturing module capturing a series of planar images, a computation module and an augmented reality module. The computation module generates an optical flow signal for obtaining the positioning coordinates, and further outputs a registration signal. The augmented reality module performs image registration processing based on the navigation signal and the registration signal, so that the guidance indication is superimposed on the series of planar images of real-world scene for subsequent display.

10 Claims, 13 Drawing Sheets

(51) Int. Cl.
*G01C 21/18* (2006.01)
*G06K 9/00* (2006.01)
(52) U.S. Cl.
CPC ........ G06T 19/006 (2013.01); *G06K 9/00691* (2013.01); *G06T 2219/004* (2013.01)

(56) References Cited

U.S. PATENT DOCUMENTS

2013/0088577 A1* 4/2013 Hakkarainen ......... G06T 19/006 348/46
2013/0249944 A1* 9/2013 Raghoebardayal ... G06T 19/006 345/633
2017/0091894 A1* 3/2017 Eldar .................... G06T 1/0007

* cited by examiner

| | 1 | 2 | 3 | 4 | 5 | 6 | 7 | 8 | 9 | 10 |
|---|---|---|---|---|---|---|---|---|---|---|
| 1 | 0 | 3 | ∞ | 4 | ∞ | ∞ | 4 | ∞ | ∞ | 5 |
| 2 | 3 | 0 | 6 | ∞ | ∞ | 6 | ∞ | ∞ | ∞ | 3 |
| 3 | ∞ | 6 | 0 | 1 | 6 | 4 | ∞ | ∞ | ∞ | ∞ |
| 4 | 4 | ∞ | 1 | 0 | 8 | ∞ | 5 | 3 | ∞ | ∞ |
| 5 | ∞ | ∞ | 6 | 8 | 0 | ∞ | ∞ | ∞ | ∞ | ∞ |
| 6 | ∞ | 6 | 4 | ∞ | ∞ | 0 | ∞ | ∞ | ∞ | ∞ |
| 7 | 4 | ∞ | ∞ | 5 | ∞ | ∞ | 0 | 7 | ∞ | ∞ |
| 8 | ∞ | ∞ | ∞ | 3 | ∞ | ∞ | 7 | 0 | 3 | ∞ |
| 9 | ∞ | ∞ | ∞ | ∞ | ∞ | ∞ | ∞ | 3 | 0 | ∞ |
| 10 | 5 | 3 | ∞ | ∞ | ∞ | ∞ | ∞ | ∞ | ∞ | 0 |

| 1 | 2 | 4 | 7 | 10 |   |
|---|---|---|---|----|---|
| 2 | 1 | 3 | 6 | 10 |   |
| 3 | 2 | 4 | 5 | 6  |   |
| 4 | 1 | 3 | 5 | 7  | 8 |
| 5 | 3 | 4 |   |    |   |
| 6 | 2 | 3 |   |    |   |
| 7 | 1 | 4 | 8 |    |   |
| 8 | 4 | 7 | 9 |    |   |
| 9 | 8 |   |   |    |   |
| 10| 1 | 2 |   |    |   |

FIG.10

NAVIGATION SYSTEM APPLYING AUGMENTED REALITY

CROSS-REFERENCE TO RELATED APPLICATION

This application claims priority of Taiwanese Application No. 104135036, filed on Oct. 26, 2015.

FIELD

The disclosure relates to a navigation system, more particularly to a navigation system which applies augmented reality technology.

BACKGROUND

Augmented reality (AR) refers to superimposing virtual information onto a user's sense perception, especially visual perception, so that not only information density perceived by senses may be enhanced but mental and physical efforts for switching between the real world and a display may also be saved. Since 1960, augmented reality technology has been vastly applied to surgical treatment, machine repair, military training, and even to video games. Moreover, with rapid development of portable devices, such as a mobile phone, a tablet computer or a wearable device, these devices provided with high performance processors, a variety of sensors and network connection capabilities are ideal to serve as a platform for augmented reality applications. As a result, application programs which adopt the augmented reality technology are springing up on the market, and a navigation system is one of the most important applications of the augmented reality technology.

However, the augmented reality resides technically on how to superimpose virtual information upon an image of real-world scene perceived by a user. Therefore, an augmented reality system must track and record posture information, e.g., a position and direction, of the user's head, more precisely, the eyes of the user, and use the posture information to obtain a projection transformation mapping matrix. For an outdoor navigation system, simply a Global Positioning system (GPS) module is required to obtain positioning information. In combination with posture information acquired by an inertial sensor module, the virtual information which contains guidance indication, such as a 2D word/phrase/graphic or 3D indication, may be superimposed on the image of real-world scene by virtue of the projection transformation mapping matrix for subsequent display on a screen. However, for an indoor navigation system, a GPS signal may be inaccessible. Therefore, aside from establishing an indoor GPS-like signal source, an approach of positioning in advance by means of landmarks or natural features may be adopted to facilitate correct representation of the virtual information on the image of real-world scene to be displayed. However, the aforementioned approaches require deployment of multiple positioning infrastructure, and further require establishment of a database which is used to determine the corresponding positioning information based on the positioning infrastructure, likely causing a higher deployment cost and complexity of the navigation system.

SUMMARY

Therefore, an object of the disclosure is to provide a navigation system which applies augmented reality by using an optical flow analysis positioning for alleviation of deployment of positioning infrastructure and establishment of a relevant database.

According to an aspect of the disclosure, the navigation system which applies augmented reality includes a measurement unit, a navigation unit and an image unit.

The measurement unit includes a positioning module that is configured to output a positioning signal associated with positioning coordinates of the navigation system. The navigation unit is coupled to the measurement unit, and is configured to perform a path planning algorithm according to the positioning signal, so as to obtain a guidance indication for guidance of a user of the navigation system. The navigation unit is further configured to output a navigation signal associated with the guidance indication. The image unit is coupled to the measurement unit and the navigation unit, and includes a capturing module, a computation module, an augmented reality module, and a display interface.

The capturing module is configured to capture a series of planar images of a spatial environment. The computation module is configured to perform an optical flow analysis upon the series of planar images, so as to generate an optical flow signal associated with a result of performance of the optical flow analysis and used to obtain the positioning coordinates. The computation module is further configured to perform plane detection processing upon each planar image of the series of planar images, so as to output a registration signal associated with a result of performance of the plane detection processing. The augmented reality module is configured to receive the navigation signal and the registration signal, and to perform image registration processing based on the navigation signal and the registration signal, so that the guidance indication is superimposed on the series of planar images of real-world scene for subsequent display.

An effect of the navigation system according to this disclosure resides in that, by performing the optical flow analysis upon the series of planar images, information regarding a direction and an amount of motion of the navigation system (along with a user thereof) is obtained to serve as a basis for subsequent positioning measurement. In this way, compared with a conventional positioning approach, a more accurate measurement result may be obtained so as to facilitate more optimized path routing by the navigation unit. Further in combination with the augmented reality module, the guidance indication may be superimposed on a floor plane in the series of planar images of real-world scene so as to provide more intuitive navigation experience.

BRIEF DESCRIPTION OF THE DRAWINGS

Other features and advantages of the disclosure will become apparent in the following detailed description of embodiment(s) with reference to the accompanying drawings, of which:

FIG. 10 is a schematic diagram illustrating an example of an optimized adjacency list according to the disclosure;

DETAILED DESCRIPTION

Figure 1:
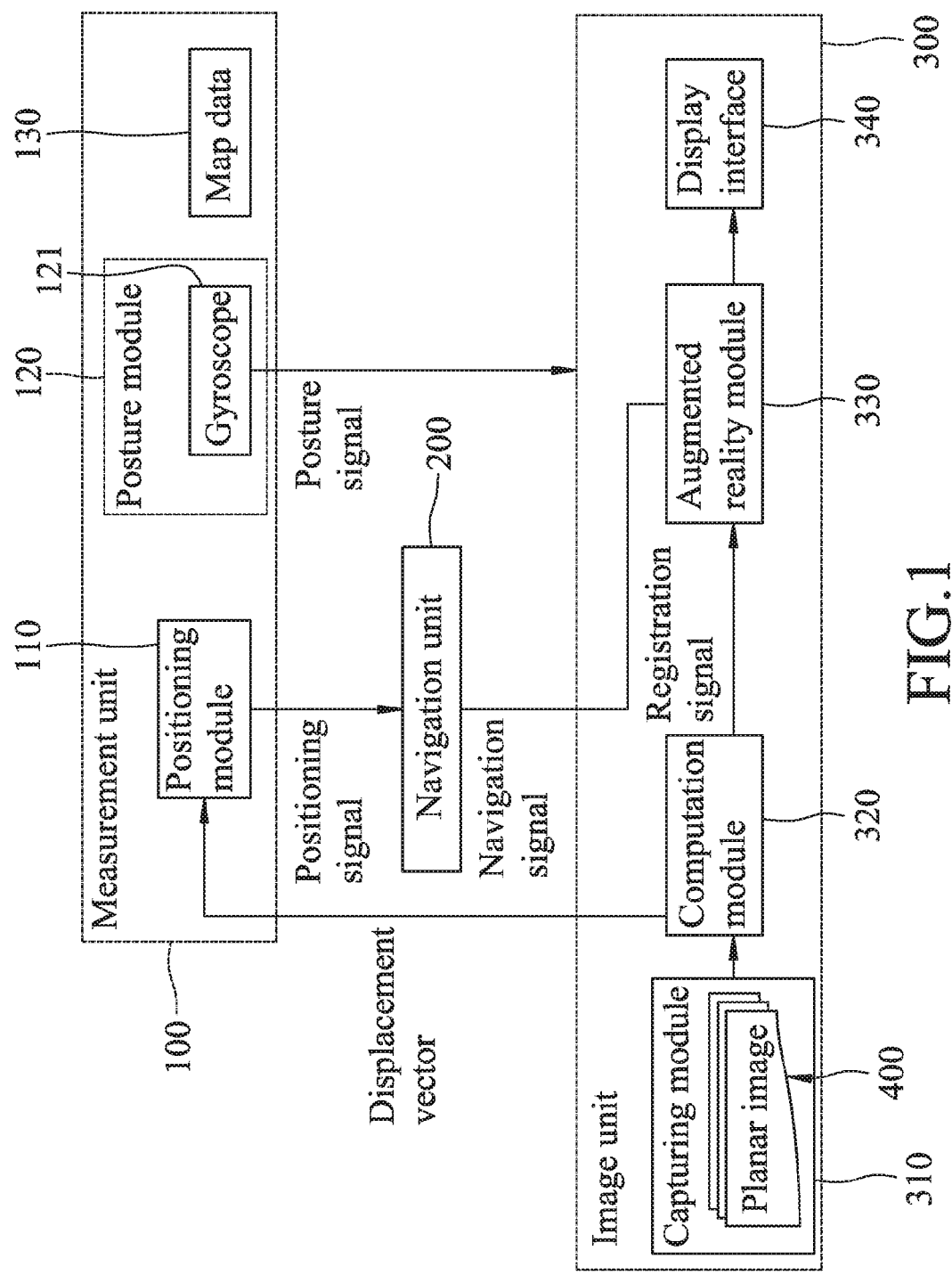
FIG. 1 is a block diagram illustrating an embodiment of a navigation system which applies augmented reality according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a navigation system which applies augmented reality according to the disclosure includes a measurement unit 100, a navigation unit 200 and an image unit 300.

The measurement unit 100 includes a positioning module 110 and a posture module 120, and stores map data 130 associated with a spatial environment in which the navigation system is to be used. The positioning module 110 is configured to output, based on position estimation processing, a positioning signal associated with positioning coordinates of the navigation system. The posture module 120 is configured to generate, based on posture computation processing, a posture signal associated with angles of rotation of the posture module 120. Specifically, in one embodiment, the posture module 120 includes a gyroscope 121 which outputs a posture angle signal associated with each axis of a self-defined coordinate system of the gyroscope 121. Alternatively, the angles of rotation may be detected by the posture module 120 in combination with an Inertial Measurement Unit (IMU), such as an e-compass, for increasing accuracy and speed of the detection.

The navigation unit 200 is coupled to the measurement unit 100, and is configured to perform a path planning algorithm according to the positioning signal received from the positioning module 110, so as to obtain guidance indication for guidance of a user of the navigation system. The navigation unit 200 outputs a navigation signal associated with the guidance indication.

The image unit 300 is coupled to the measurement unit 100 and the navigation unit 200, and includes a capturing module 310, a computation module 320, an augmented reality module 330 and a display interface 340. The capturing module 310 is configured to capture a series of planar images 400 of the spatial environment. The computation module 320 is configured to perform an optical flow analysis upon the series of planar images 400 so as to generate an optical flow signal associated with a result of performance of the optical flow analysis and used to obtain the positioning coordinates. The computation module 320 is further configured to perform plane detection processing upon each planar image of the series of planar images 400 so as to output a registration signal associated with a result of performance of the plane detection processing. The augmented reality module 330 is configured to receive the navigation signal and the registration signal, and to perform image registration processing based on the navigation signal and the registration signal, so that the guidance indication is superimposed precisely on a floor plane in the series of planar images 400 of real-world scene for subsequent display on the display interface 340. The display interface 340 is exemplified as a screen or a projector.

An embodiment of steps performed by each of the aforementioned modules are explained hereinafter.

Figure 2:
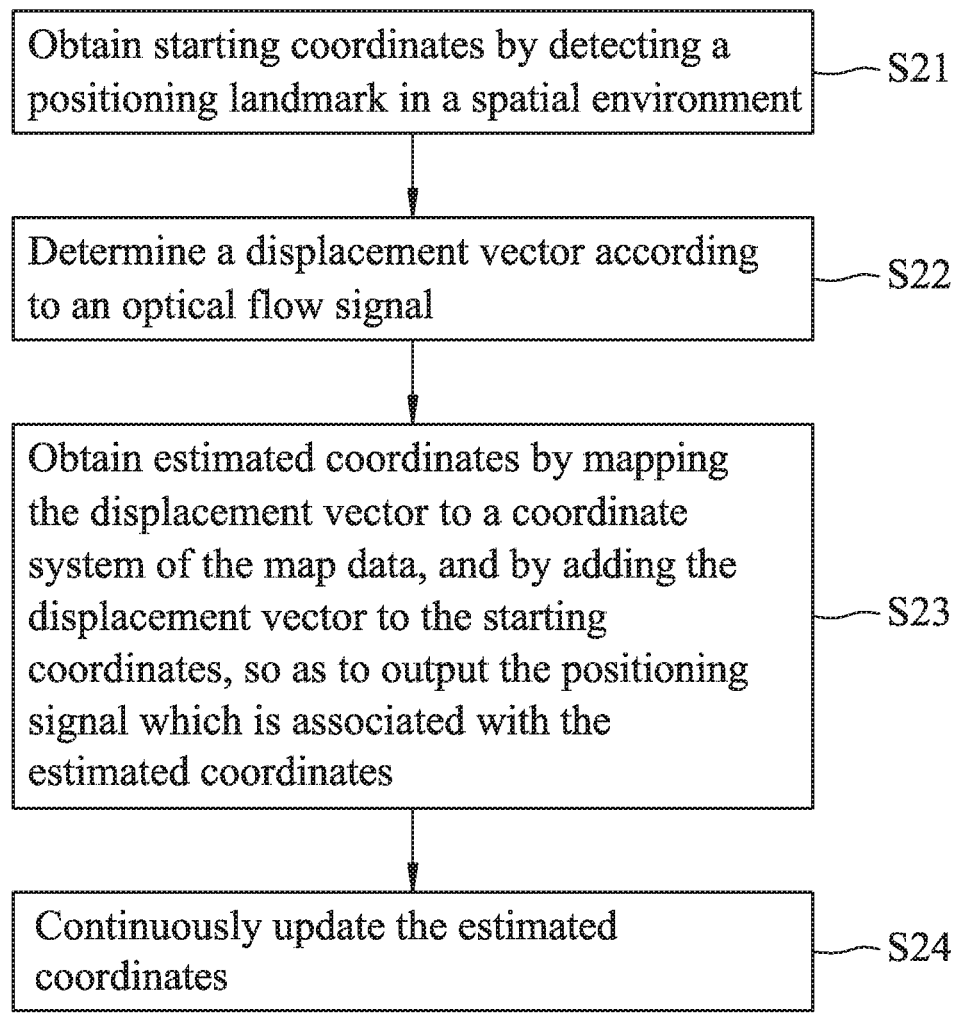
FIG. 2 is a flow chart illustrating an embodiment of position estimation processing according to the disclosure.

In order to prevent a condition that Global Positioning System (GPS) is unusable due to weak signal indoors, and in order to minimize deployment of positioning infrastructure for reducing an overall deployment cost and complexity, a flow chart of the position estimation processing is illustrated in FIG. 2 and includes the following steps.

Referring to FIGS. 1 and 2, in step S21, the positioning module 110 obtains starting coordinates of the navigation system by detecting a positioning landmark in the spatial environment. The positioning landmark is an infrastructure which is deployed in advance in the spatial environment and is to be recognized for facilitating positioning of the navigation system, such as markers adopting Quick Response (QR) code technology or sensors adopting Radio Frequency Identification (RFID) technology. When the positioning landmark is exemplified as markers adopting the QR code technology, the capturing module 310 is used to capture an image of a QR code, and the computation module 320 is configured to analyze the image of the QR code thus captured in combination with a database contained in the positioning module 110, so as to determine location information associated with the QR code, such that the starting coordinates are obtained. On the other hand, when the positioning landmark is exemplified as sensors adopting the RFID technology, a sensor of the navigation system may be utilized to receive an RFID signal, and the computation module 320 is configured to analyze the RFID signal thus received in combination with a database contained in the positioning module 110, so as to determine location information associated with the RFID signal, such that the starting coordinates may be obtained. It should be noted that, in an embodiment of the disclosure, the positioning landmark is implemented in a marker form of a QR code, because of a relatively lower deployment cost compared with the RFID; moreover, the sensor for detecting RFID signals may be omitted so as to reduce the hardware cost of the navigation system.

In step S22, the computation module 320 determines a displacement vector according to the optical flow signal. As mentioned above, GPS signals may be inaccessible indoors. Therefore, the image unit 300 of the navigation system performs the optical flow analysis upon the series of planar images 400 so as to obtain the optical flow signal, and detection of a displacement and/or zoom-in/zoom-out of the capturing module 310 is made based on the optical flow signal, so as to determine the displacement vector associated with displacement of the capturing module 310 of the navigation system.

Figure 3:
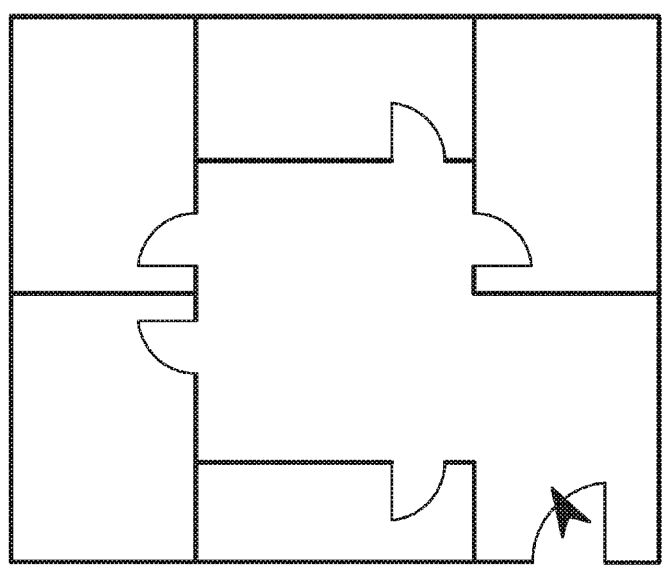
FIG. 3 is a schematic diagram illustrating an example of map data.

In step S23, the positioning module 110 obtains estimated coordinates by mapping the displacement vector determined in step S22 to a coordinate system of the map data 130, and by adding the displacement vector thus mapped to the starting coordinates obtained in step S21, so as to output the positioning signal which is associated with the estimated coordinates. The estimated coordinates serve as the positioning coordinates of the navigation system. It should be noted that the map data 130 is a two-dimensional map as shown in FIG. 3, and may be regarded as a top view of the spatial environment. Since the coordinate system of the map data 130 has a transformation relationship with a coordinate system of the spatial environment, the displacement vector determined by the computation module 320 must undergo mapping operation for obtaining the estimated coordinates. In this way, a position of the user may be correctly represented on the map data 130. Meanwhile, the estimated coordinates are important for the following steps of generating the guidance indication.

In step S24, the positioning module 110 continuously updates the estimated coordinates. Specifically, the positioning module 110 determines if there exist the estimated coordinates. When it is determined that there do not exist the estimated coordinates, the positioning module 110 obtains the starting coordinates by detecting the positioning landmark as mentioned in step S21. When it is determined that there exist the estimated coordinates, the positioning module 110 obtains updated estimated coordinates by mapping the displacement vector, which is determined by the computation module 320 according to the optical flow signal in step S22, to the coordinate system of the map data 130, and by adding the displacement vector thus mapped to the estimated coordinates, so as to continuously update the estimated coordinates and to output the positioning signal associated with the estimated coordinates.

Figure 4:
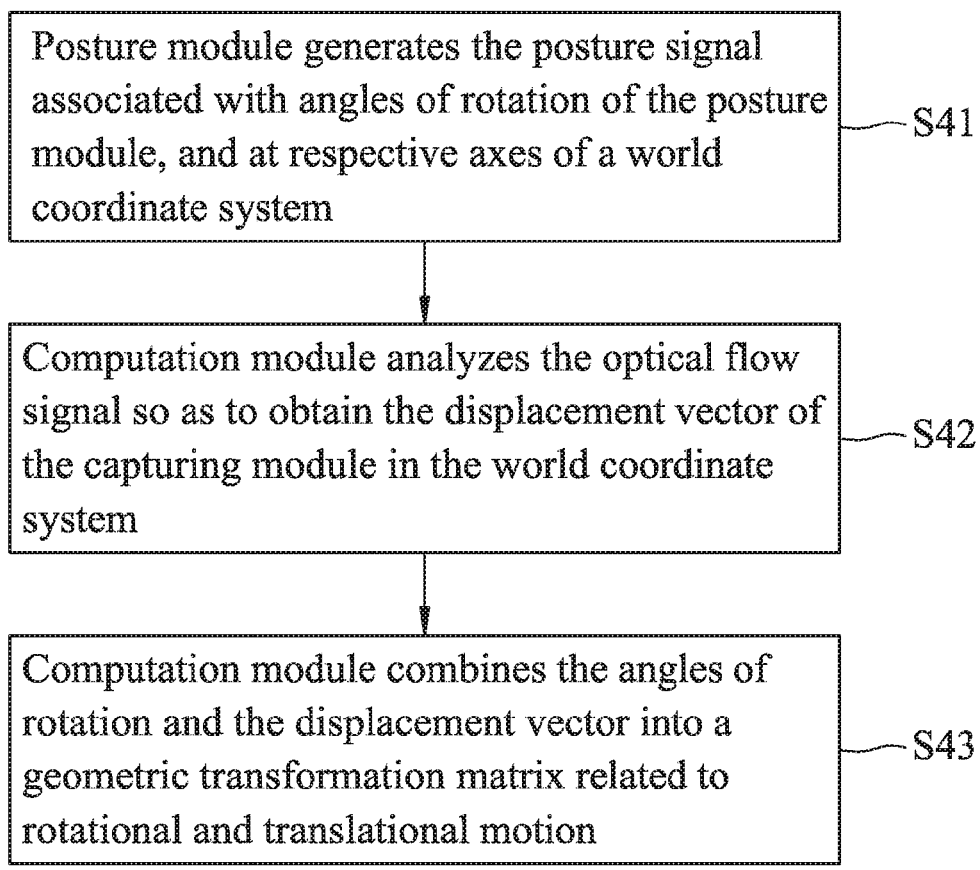
FIG. 4 is a flow chart of an embodiment of posture computation processing according to the disclosure.

Subsequently, in order to correctly superimpose the guidance indication on the series of planar images 400 of real-world scene, and in order to promote the effect of augmented reality, it is important for the capturing module 310 to achieve accurate posture detection. In conventional augmented reality systems, markers are usually adopted to facilitate estimation of translational and rotational variations of the capturing module 310, such as displacement, rotation and zoon-in/zoom-out. However, not only must these markers be deployed in advance in the spatial environment, causing higher cost, but a corresponding database must also be established. Moreover, details of the deployment of the markers should be considered, such as locations and angles of the markers; as a result, flexibility and convenience in usage may be sacrificed. Therefore, a flow chart of the posture computation processing is illustrated in FIG. 4 and includes the following steps for overcoming the aforementioned drawbacks.

In step S41, the posture module 120 generates the posture signal associated with angles of rotation of the posture module 120 and at respective axes of a world coordinate system. In this step, the gyroscope 121 outputs the posture angle signal associated with each axis of the self-defined coordinate system of the gyroscope 121. The posture module 120 analyzes the posture angle signal to obtain posture angles at respective axes of the coordinate system of the gyroscope 121, and outputs, based on components of a gravitational acceleration on respective axes of the coordinate system of the gyroscope 121, the posture signal associated with angles of rotation of the posture module 120 at respective axes of the world coordinate system.

In step S42, the computation module 320 analyzes the optical flow signal so as to obtain the displacement vector of the capturing module 310 in the world coordinate system. In this step, the computation module 320 performs the optical flow analysis upon the series of planar images 400 captured by the image unit 300 so as to obtain the optical flow signal, and estimates, according to the optical flow signal, a displacement vector of the capturing module 310 in a coordinate system of the capturing module 310. The computation module 320 performs coordinate transformation to generate the displacement vector in the world coordinate system from the displacement vector in the coordinate system of 310.

In step S43, the computation module 320 combines the angles of rotation of the posture module 120 and the displacement vector of the capturing module 310 which are mapped to the world coordinate system into a geometric transformation matrix related to rotational and translational motion. It should be noted that since the posture module 120 and the capturing module 310 have different coordinate systems, these coordinates systems have a coordinate transformation relationship therebetween, which is associated with rotation and displacement, and is found based on a calibration procedure. Through the coordinate transformation relationship, a geometric relationship between each module is represented in the same coordinate system, i.e., the world coordinate system. It should be noted that, the geometric transformation matrix also plays an important role in the subsequent image registration processing.

Figure 5:
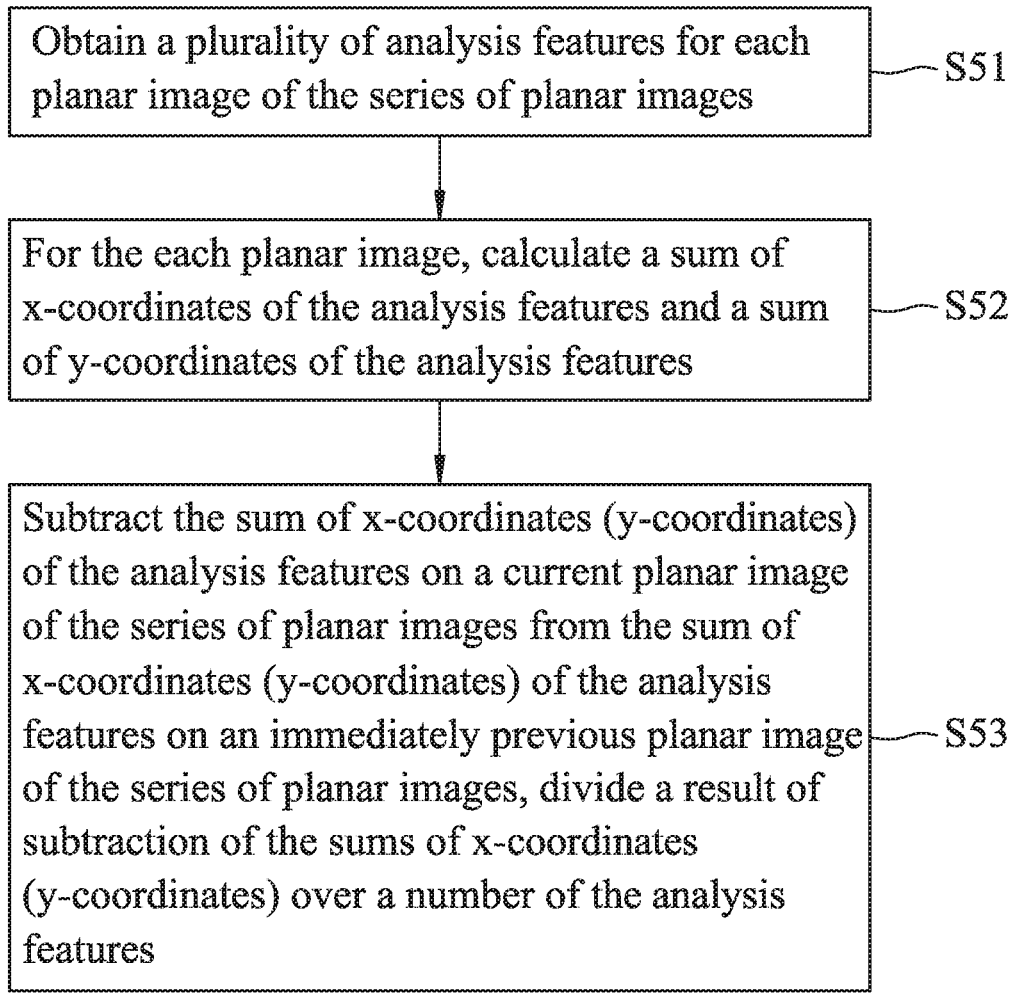
FIG. 5 is a flow chart of an embodiment of an optical flow analysis according to the disclosure.

Accordingly, information regarding the position and posture has been obtained by the measurement unit 100. Moreover, it is evident from above that not only the displacement vector of the capturing module 310 but also the positioning coordinates of the navigation system can be obtained based on the optical flow signal. Details regarding the optical flow analysis are explained hereinafter. In addition, since feature points in an ordinary spatial environment are usually not distinguishable, a conventional optical flow approach which is required to extract and track the feature points has an inaccurate estimation result when estimating the variation of the capturing module 310, such as displacement and/or zoom-in/zoom-out. Therefore, the optical flow analysis according to the disclosure does not adopt feature point tracking, and instead adopts fixed-dot-matrix optical flow field. A flow chart of the optical flow analysis is illustrated in FIG. 5 and includes the following steps.

In step S51, the computation module 320 obtains a plurality of analysis features for each planar image of the series of planar images 400, and records pixel coordinates for each of the analysis features. The analysis features may be exemplified as feature points.

In step S52, the computation module 320, for each planar image, calculates a sum of x-coordinates of the analysis features and a sum of y-coordinates of the analysis features.

In step S53, the computation module 320 subtracts the sum of x-coordinates of the analysis features on a current planar image of the series of planar images 400 from the sum of x-coordinates of the analysis features on an immediately previous planar image of the series of planar images 400, divides a result of the subtraction of the sums of x-coordinates over a number of the analysis features, subtracts the sum of y-coordinates of the analysis features on the current planar image from the sum of y-coordinates of the analysis features on the immediately previous planar image, and divides a result of subtraction of the sums of y-coordinates over the number of the analysis features, so as to generate the optical flow signal which is associated with a result of the aforementioned calculations and adapted for estimation of the displacement vector. Note that in the following description, the current and immediately previous planar images may be referred to as "two consecutive planar images".

Steps S52 and S53 may be expressed by the following formulas (1) and (2):

$$T_x = \frac{\sum_{i=1}^{k} P_{in,x} - \sum_{i=1}^{k} P_{im,x}}{k} \qquad (1)$$

$$T_y = \frac{\sum_{i=1}^{k} P_{in,y} - \sum_{i=1}^{k} P_{im,y}}{k}, \qquad (2)$$

where $P_{in,x}$ and $P_{im,x}$ respectively represent the x-coordinates of an i-th analysis pixel on two consecutive planar images of the series of planar images 400, $P_{in,y}$ and $P_{im,y}$ respectively represent the y-coordinates of the i-th analysis feature on the two consecutive planar images, k represents a number of analysis features in each planar image of the series of planar images 400, $T_x$ and $T_y$ respectively represent displacement quantities of an optical flow field between two consecutive planar images along an X-axis and a Y-axis of the series of planar images 400, and the optical flow signal is associated with $T_x$ and $T_y$.

Detailed steps regarding analyzing the optical flow signal so as to obtain the displacement vector of the capturing module 310 in the world coordinate system are explained hereinafter.

For each planar image, the displacement quantities $T_x$ and $T_y$ of the optical flow field are used to directly estimate displacement amounts ΔX and ΔZ of the capturing unit 310 along an X-axis (see FIG. 13), i.e., the transverse direction, and a Z-axis (see FIG. 13), i.e., the perpendicular direction of the world coordinate system. The displacement amounts ΔX and ΔZ are expressed by the following formulas (3) and (4):

$$\Delta X = u T_x \qquad (3)$$

$$\Delta Z = v T_y, \qquad (4)$$

where u and v represent parameters associated with the capturing module 310.

However, a displacement amount ΔY of the capturing module 310 along a Y-axis of the world coordinate system is obtained based on the pinhole imaging principle.

Figure 13:
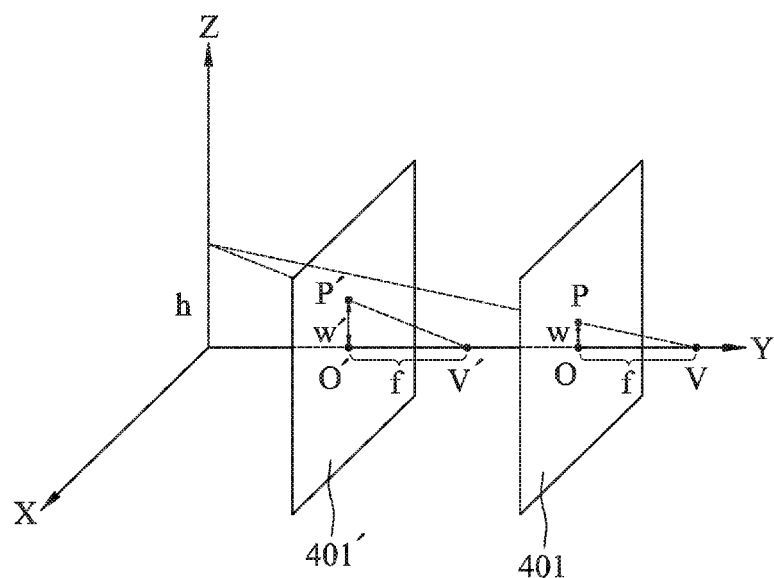
FIG. 13 is a schematic diagram illustrating a displacement amount of optical flow analysis positioning between two consecutive planar images along a Y-axis of a world coordinate system.

Referring to FIG. 13, there exists the displacement amount ΔY between two consecutive planar images of the series of planar images 400 (i.e., an initial planar image 401 and a displaced planar image 401'); that is to say, there exists the displacement amount ΔY of a focal point of the capturing module 310 between two consecutive time points along the Y-axis of the world coordinate system. In FIG. 3, V represents an initial y-coordinate of the focal point along the Y-axis of the world coordinate system, and V' represents a y-coordinate of the focal point along the Y-axis of the world coordinate system after the capturing module 310 has been displaced. When a focal length f of the capturing module 310 is fixed, a difference between V and V' serves as the displacement amount ΔY. On the other hand, an optical flow point P in the initial planar image 401 corresponds to an optical flow point P' in the displaced planar image 401', and the optical flow points P and P' respectively have heights w and w' with respect to centers O and O' of the initial planar image 401 and the displaced planar image 401', respectively. When the focal length f is fixed, ΔY is expressed by the following formula (5) based on the pinhole imaging principle and triangulation:

$$\Delta Y = V\left(1 - \frac{w}{w'}\right) = \frac{f \times h}{w}\left(1 - \frac{w}{w'}\right), \qquad (5)$$

where h represents a height along the Z-axis on far-end indoor wall at which the optical flow point P is projected from the y-coordinate V of the focal point. Meanwhile, h also represents a height along the Z-axis on far-end indoor wall at which the optical flow point P' is projected from the y-coordinate V' of the focal point.

In this way, by geometric relationship of the heights w and w' of the optical flow points P and P' in the initial planar image 401 and the displaced planar image 401', respectively, and by geometric relationship of parameters of the capturing module 310, such as the focal length f and the y-coordinate V of the focal point, the displacement amount ΔY can be derived therefrom.

Since the optical flow analysis according to the disclosure does not adopt the feature point tracking technique, computation time is reduced. Moreover, a scene that an optical flow direction of each feature point is difficult to determine due to insignificance of the feature point and result in considerable error in the estimation result may be prevented. Therefore, the optical flow analysis is able to promote real-time performance of the navigation system so as to reduce detection error regarding optical flow. Moreover, the optical flow analysis is immune to interference from ambient brightness indoors and displacement of objects in background.

Figure 6:
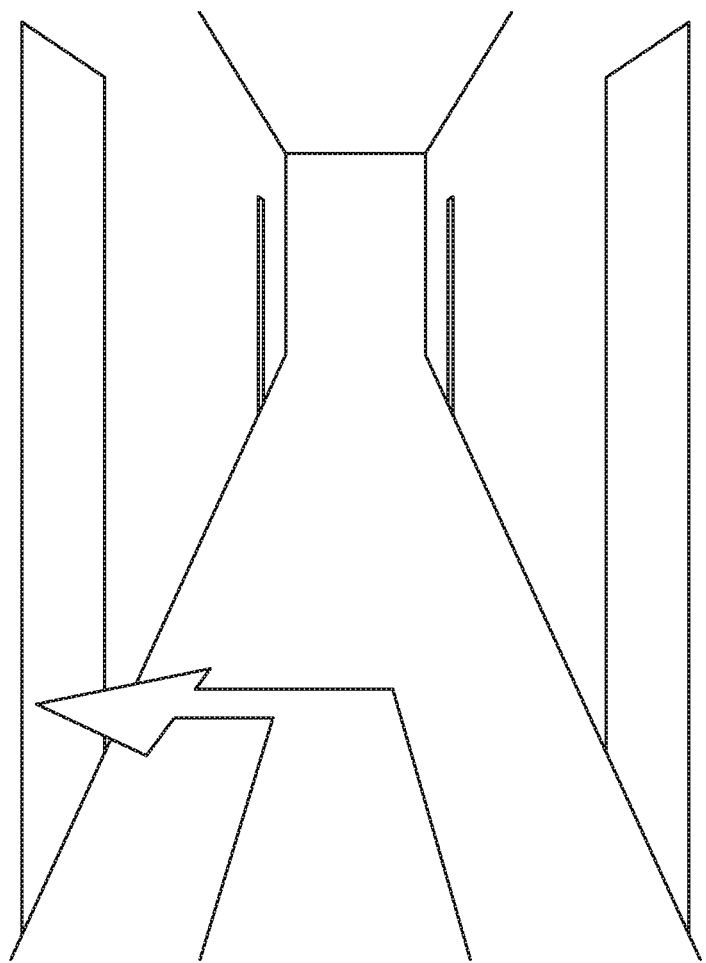
FIG. 6 is a schematic diagram illustrating an example that guidance indication is represented in a manner of a graphic of an arrow in a planar image of real-world scene.
Figure 7:
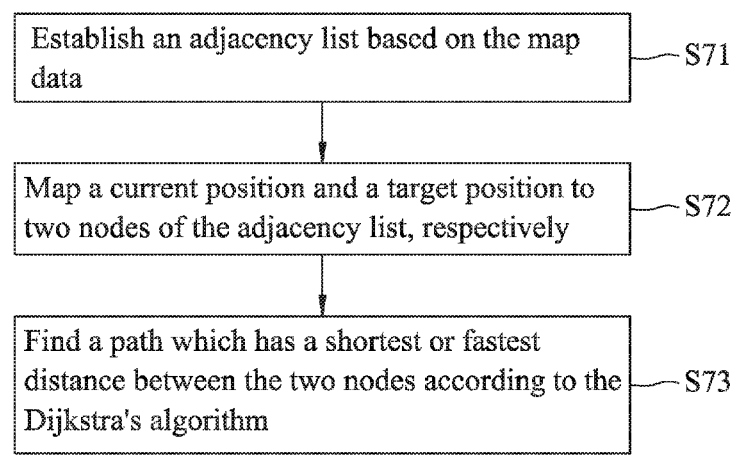
FIG. 7 is a flow chart of an embodiment of a path planning algorithm according to the disclosure.

Subsequently, the user inputs a target position in the map data 130, and the path planning algorithm is performed further in combination with a current position, i.e., the estimated coordinates in the map data 130 obtained in step S23, so as to generate the guidance indication for guiding the user to move from the current position to the target position along a planned path. It should be noted that, in one embodiment, the guidance indication is represented in a manner of a graphic of an arrow as exemplified in FIG. 6. However, the guidance indication may be represented in another manner, such as a word/phrase or a graphic in combination with a word/phrase for guiding the user. A flow chart of the path planning algorithm is illustrated in FIG. 7 and includes the following steps:

In step S71, the navigation unit 200 establishes an adjacency list based on the map data 130.

In step S72, the navigation unit 200 maps the current position, which is associated with the positioning coordinates contained in the positioning signal, and the target position to two nodes of the adjacency list, respectively.

In step S73, the navigation unit 200 finds a path which has a shortest distance or time between the two nodes according to the Dijkstra's algorithm, so as to obtain the guidance indication associated with the path thus found.

The aforementioned steps are explained in more detail hereinafter.

Figure 8:
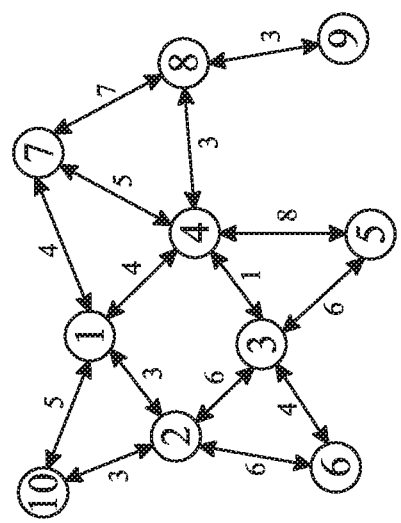
FIG. 8 is a schematic diagram illustrating an example of an adjacency matrix according to the disclosure.
Figure 9:
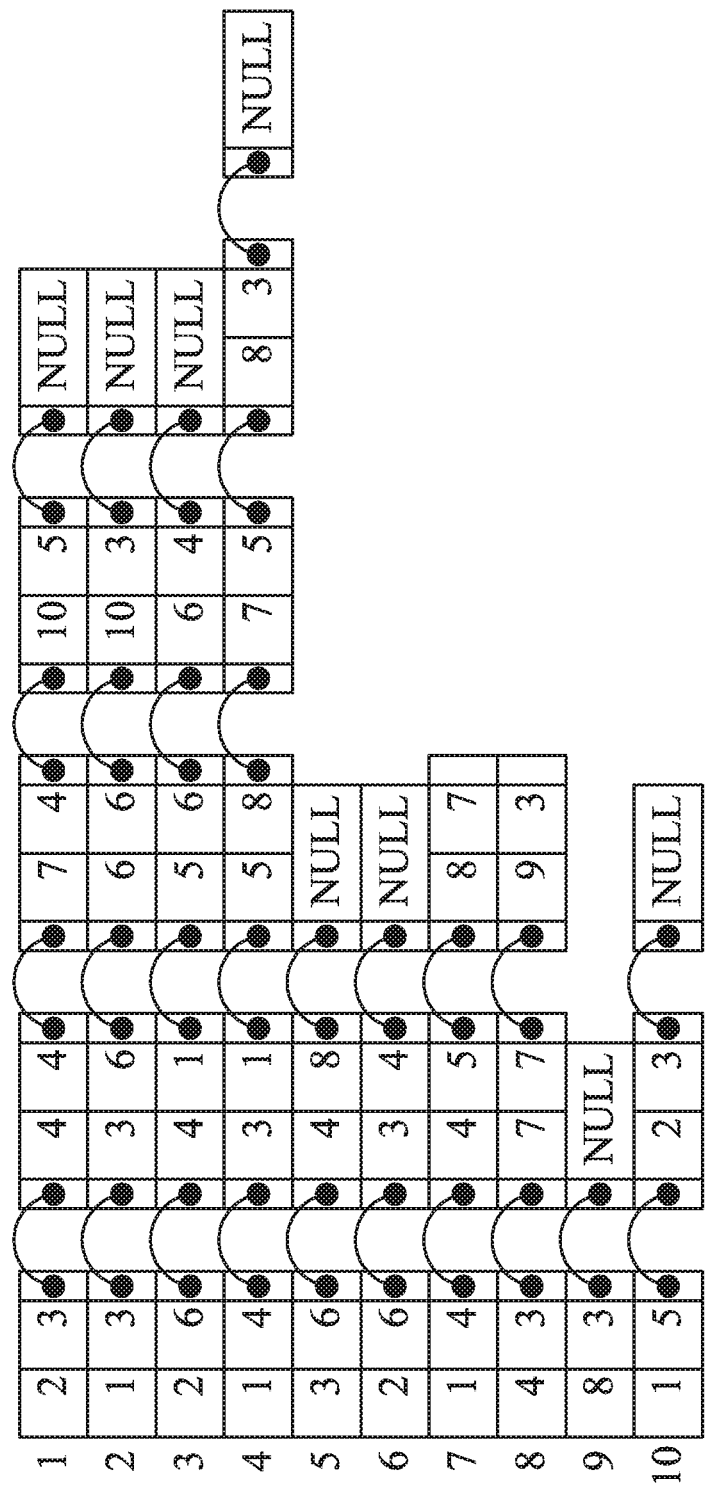
FIG. 9 is a schematic diagram illustrating an example of an adjacency list according to the disclosure.

In step S71, path searching is performed based on connected nodes in the map data 130, and is to quickly and efficiently find the shortest or fastest path. A modeling strategy of relaxation is usually utilized for path searching. When an adjacency matrix shown in FIG. 8 is adopted, since relationships between nodes are not definite, a range of possibility cannot be effectively confined. Therefore, for each node, all paths between the node and other nodes are considered every time the relaxation operation is performed, so the navigation module 200 may have inefficient computational performance. In this way, an adjacency list which is combined with coordinate information so as to record definite node relationships is shown in FIG. 9. During the processing of relaxation, relaxation is performed definitely on nodes that are connected so as to save computational time. Moreover, since elements of a matrix are capable of storing coordinate information which is usable for dynamic distance calculation, the adjacency list shown in FIG. 9 can be further simplified to result in an optimized adjacency list shown in FIG. 10. The optimized adjacency list thus simplified is required to only record for each node, numberings of other nodes that are connected thereto, so as to significantly simplify the establishment of the map data 130, and to facilitate subsequent data update.

In step S73, in the Dijkstra's algorithm, a shortest or fastest path tree is first established. First, the node which represents the current position serves as a starting point, and distances or times between the node and other nodes are searched and compared so as to determine a nearest node with respect to the node (i.e., the current position). Next, the nearest node thus determined serves as the starting point, and relaxation is performed on nodes which are not on the shortest or fastest path tree. The aforementioned steps are repeated until a node which represents the target position is added to the shortest or fastest path tree, at which time the path searching algorithm is finished. The path thus found serves as the path having the shortest distance or time between the current position and the target position.

Finally, the guidance indication is superimposed on the series of planar images 400 of real-world scene for subsequent display on the display interface 340. In this processing, how to correctly register the guidance indication to the real-world scene and superimpose the guidance indication on the series of planar images 400 of real-world scene in accordance with the user's spatial perception is the critical issue of the augmented reality technology. Therefore, in this disclosure, image processing for the series of planar images 400 includes two parts. First, the computation module 320 performs the plane detection processing upon each planar image of the series of planar images 400. Second, the augmented reality module 330 performs the image registration processing based on the navigation signal and the registration signal.

The plane detection processing is used to find positions in the series of planar images 400 to which a floor plane in the spatial environment is mapped, so as to superimpose the guidance indication in a form of an arrow onto the positions in the series of planar images 400 of real-world scene thus found, for allowing the user to obtain the guidance indication and moving directions associated with the guidance information via the display interface 340.

Figure 11:
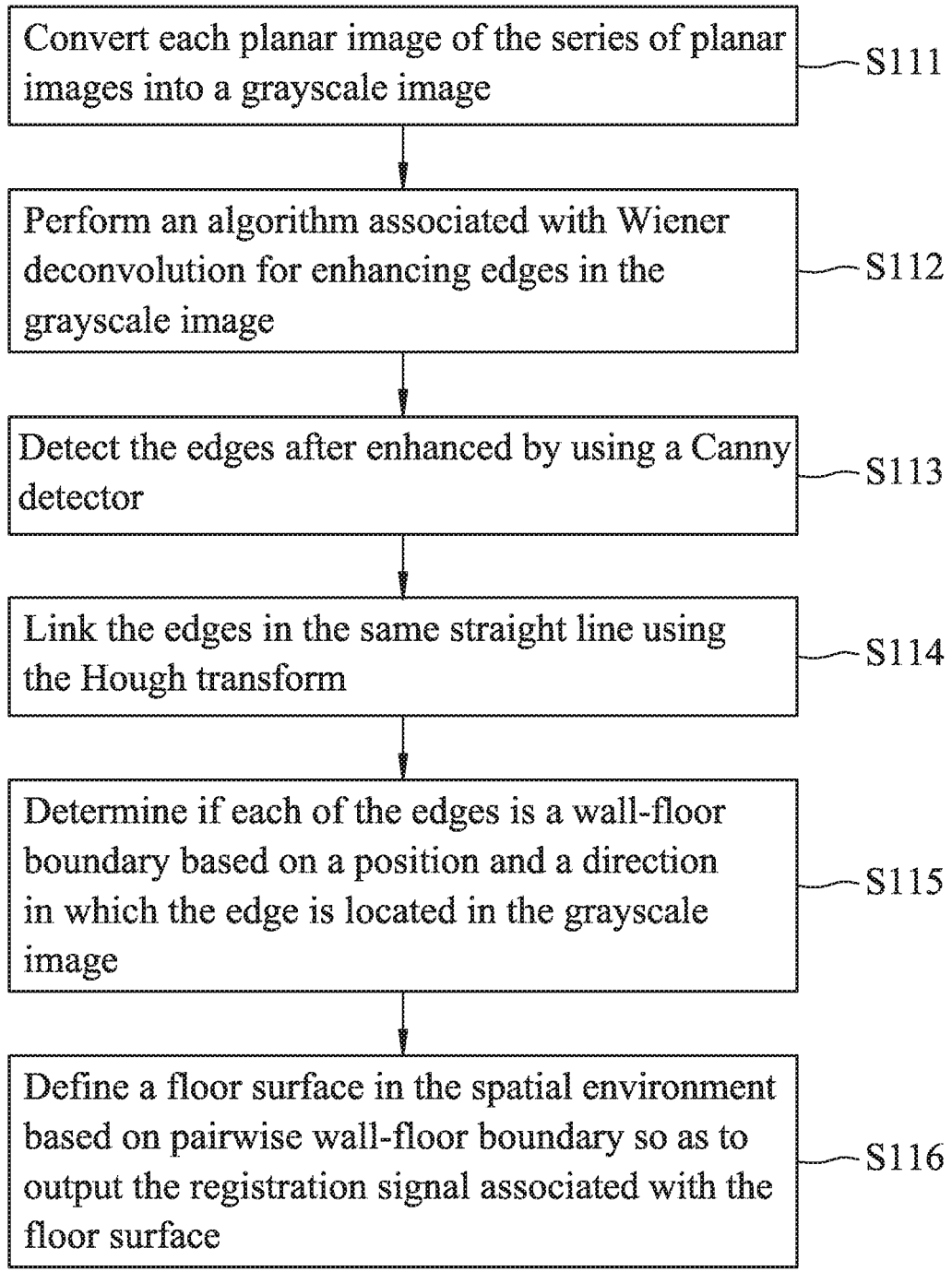
FIG. 11 is a flow chart of an embodiment of plane detection processing according to the disclosure.

A flow chart of the plane detection processing is illustrated in FIG. 11 and includes the following steps.

In step S111, the computation module 320 converts each planar image of the series of planar images 400 into a grayscale image. It should be noted that even though a colored image contains more information, for subsequent image processing, the grayscale image may reduce computation time and save memory consumption.

In step S112, the computation module 320 performs an algorithm associated with Wiener deconvolution for enhancing edges in the grayscale image.

In step S113, the computation module 320 detects the edges thus enhanced by using a Canny detector.

In step S114, the computation module 320 connects the edges in a same straight line using the Hough transform.

In step S115, the computation module 320 determines if each of the edges is a wall-floor boundary based on a position and a direction in which the edge is located in the grayscale image.

In step S116, the computation module 320 defines a floor plane in the spatial environment based on pairwise wall-floor boundary so as to output the registration signal associated with the floor plane.

Figure 12:
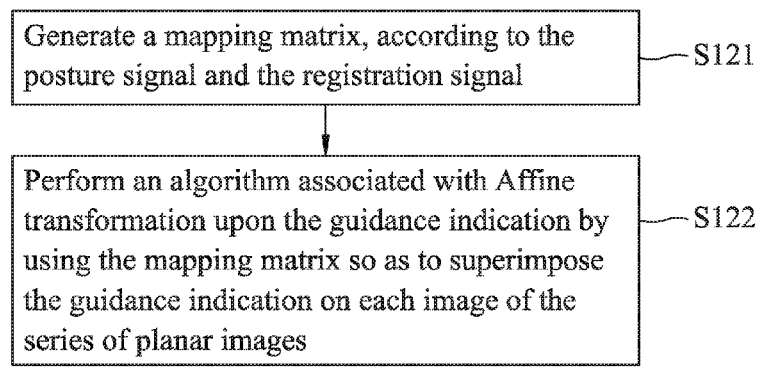
FIG. 12 is a flow chart of an embodiment of image registration processing according to the disclosure.

On the other hand, a flow chart of the image registration processing is illustrated in FIG. 12 and includes the following steps.

In step 121, the augmented reality module 330 generates, according to the posture signal and the registration signal, a mapping matrix. It should be noted that the mapping matrix is associated with a mapping relationship between different coordinate systems. Specifically, the mapping matrix is associated with a mapping relationship between the guidance indication and the coordinate system of the series of planar images 400 of real-world scene. Moreover, a Homography matrix is ordinarily utilized to represent the mapping matrix so as to integrate the projective transformation relationship regarding rotational and translational motions, respectively. Alternatively, the geometric transformation matrix obtained in step S43 of the posture computation processing also has a mapping relationship similar to that of the mapping matrix. Therefore, the geometric transformation matrix may serve as the mapping matrix as long as relevant parameters of the capturing module 310 are considered, so as to obtain the mapping relationship between the world coordinate system and the coordinate system of the series of planar images 400.

In step S122, the augmented reality module 330 performs an algorithm associated with Affine transformation upon the guidance indication by using the mapping matrix thus generated so as to superimpose the guidance indication on each planar image of the series of planar images 400 of real-world scene for subsequent display on the display interface 340.

To sum up, the navigation system which applies augmented reality according to the disclosure is able to effectively reduce deployment cost and system complexity, so that the navigation system may be implemented in a head-mounted display device or any other augmented reality platforms, such as Google Cardboard. In this way, any portable device, such as a mobile phone or a tablet computer, may become a navigation system which applies augmented reality technology. Moreover, the guidance indication is represented in a manner of augmented reality so as to provide intuitive navigation experience for the user.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A navigation system which applies augmented reality, comprising:
   a measurement unit including a positioning module that is configured to output a positioning signal associated with positioning coordinates of said navigation system;
   a navigation unit coupled to said measurement unit, and configured to perform a path planning algorithm according to the positioning signal, so as to obtain guidance indication for guidance of a user of said navigation system, said navigation unit being further configured to output a navigation signal associated with the guidance indication; and
   an image unit coupled to said measurement unit and said navigation unit, and including
      a capturing module that is configured to capture a series of planar images of real-world scene,
      a computation module that is configured to perform an optical flow analysis upon the series of planar images so as to generate an optical flow signal associated with a result of performance of the optical flow analysis and used to obtain the positioning coordinates, said computation module being further configured to perform plane detection processing upon each planar image of the series of planar images so as to output a registration signal associated with a result of performance of the plane detection processing, and
      an augmented reality module that is configured to receive the navigation signal and the registration signal, and to perform image registration processing based on the navigation signal and the registration signal, so that the guidance indication is superimposed on the series of planar images of real-world scene for subsequent display.

2. The navigation system of claim 1, wherein to realize the optical flow analysis for generation of the optical flow signal, said computation module is further configured to:
   obtain a plurality of analysis features for each planar image of the series of planar images, and recording pixel coordinates for each of the analysis features;
   for each planar image, calculate a sum of x-coordinates of the analysis features and a sum of y-coordinates of the analysis features; and
   subtract the sum of x-coordinates of the analysis features on a current planar image of the series of planar images from the sum of x-coordinates of the analysis features on a previous planar image of the series of planar images, divide a result of subtraction of the sums of x-coordinates over a number of the analysis features, subtract the sum of y-coordinates of the analysis features on the current planar image of the series of planar images from the sum of y-coordinates of the analysis features on the previous planar image of the series of planar images, and divide a result of subtraction of the sums of y-coordinates over the number of the analysis features, so as to generate the optical flow signal.

3. The navigation system of claim 1, wherein to realize the plane detection processing for outputting the registration signal, said computation module is further configured to:
   convert each planar image into a grayscale image;
   perform an algorithm associated with Wiener deconvolution for enhancing edges in the grayscale image;
   detect the edges thus enhanced by using a Canny detector;
   connect the edges in a same straight line using the Hough transform;
   determine if each of the edges is a wall-floor boundary based on a position and a direction in which the edge is located in the grayscale image; and
   define a floor plane in the spatial environment based on pairwise wall-floor boundary so as to output the registration signal associated with the floor plane.

4. The navigation system of claim 1,
   wherein said measurement unit further includes a posture module which is configured to generate a posture signal associated with angles of rotation of said posture module; and
   wherein said image unit further includes a display interface, and to realize the image registration processing, said augmented reality module is further configured to
      generate, according to the posture signal and the registration signal, a mapping matrix which is associated with a mapping relationship between different coordinate systems, and
      perform an algorithm associated with Affine transformation upon the guidance indication by using the mapping matrix thus generated so as to superimpose the guidance indication on the series of planar images of real-world scene for subsequent display on said display interface.

5. The navigation system of claim 1,
   wherein said measurement unit stores map data associated with the spatial environment;
   wherein said computation module is configured to determine a displacement vector associated with displacement of said capturing module according to the optical flow signal;
   wherein said positioning module is configured to perform, according to the displacement vector determined by said computation module, position estimation processing with reference to a coordinate system of the map data, so as to output the positioning signal associated with the positioning coordinates of said navigation system located at said coordinate system of the map data.

6. The navigation system of claim 5, wherein to realize the position estimation processing for outputting the positioning signal, said positioning module is further configured to:
   obtain starting coordinates of said navigation system by detecting a positioning landmark in the spatial environment; and
   obtain estimated coordinates by mapping the displacement vector to said coordinate system of the map data, and by adding the displacement vector thus mapped to the starting coordinates, so as to output the positioning signal which is associated with the estimated coordinates, the estimated coordinates serving as the positioning coordinates.

7. The navigation system of claim 6, wherein said positioning module is further configured to:
   determine if there exist the estimated coordinates;
   when it is determined that there do not exist the estimated coordinates, obtain the starting coordinates by detecting the positioning landmark; and
   when it is determined that there exist the estimated coordinates, obtain updated estimated coordinates by adding the displacement vector, which is determined by said computation module according to the optical flow signal, to the estimated coordinates, and by mapping a result of the addition to said coordinate system of the map data, so as to continuously update the estimated coordinates and to output the positioning signal associated with the estimated coordinates.

8. The navigation system of claim 5, wherein to realize the path planning algorithm for obtaining the guidance indication, said navigation unit is further configured to:

establish an adjacency list based on the map data;

map a current position, which is associated with the positioning coordinates contained in the positioning signal, and a target position to two nodes of the adjacency list, respectively; and find a path which has a shortest distance or time between the two nodes according to the Dijkstra's algorithm, so as to obtain the guidance indication associated with the path thus found.

9. The navigation system of claim 8, wherein the guidance indication superimposed on the series of planar images of real-world scene is represented in a manner of at least one of a graphic or a word for guiding a user of said navigation system to move from the current position to the target position along the path thus found.

10. The navigation system of claim 1, wherein said measurement unit further includes a posture module which generates a posture signal associated with angles of rotation of said posture module, said posture module includes a gyroscope which outputs a posture angle signal associated with each axis of a self-defined coordinate system of said gyroscope, and said posture module, based on the posture angle signal and a gravitational acceleration, outputs the posture signal associated with angles of rotation of said posture module at respective axes of a world coordinate system.

* * * * *